United States Patent

[11] 3,524,433

| | | |
|---|---|---|
| [72] | Inventor | Darwin L. Sampson<br>Wichita, Kansas |
| [21] | Appl. No. | 709,983 |
| [22] | Filed | March 4, 1968 |
| [45] | Patented | Aug. 18, 1970 |
| [73] | Assignee | Grain Belt Supply Company, Inc.<br>Salina, Kansas<br>a Corp. of Kansas |

[54] LIQUID APPLICATOR FOR ANIMALS
9 Claims, 4 Drawing Figs.

[52] U.S. Cl. ........................................... 119/157
[51] Int. Cl. ........................................... A01k 29/00
[50] Field of Search .................................. 119/157

[56] References Cited
UNITED STATES PATENTS

| 2,949,885 | 8/1960 | Worden ..................... | 119/157 |
| 3,203,400 | 8/1965 | Hesse ........................ | 119/157 |
| 3,295,502 | 1/1967 | Muhe ........................ | 119/157 |

*Primary Examiner*— Aldrich F. Medbery
*Attorney*—Schmidt, Johnson, Hovey, Williams and Chase ABSTRACT: A liquid applicator for animals including an elongated, cylindrical tank surrounded by a layer of fabric and received within an elongated, cylindrical animal rubbing member. The tank is supported in a generally horizontal position for rotation about its longitudinal axis. Apertures, located substantially midway between the ends of the tank, communicate with elongated tubes extending into the liquid in the tank and having upwardly opening cups at their ends. Rotation of the tank about its longitudinal axis transfers liquid through the tubes and apertures to the fabric layer for distribution to a depending fabric apron.

Patented Aug. 18, 1970 3,524,433

INVENTOR
Darwin L. Sampson

BY Schmidt, Johnson, Hovey,
Williams & Bradley
ATTORNEYS

LIQUID APPLICATOR FOR ANIMALS

This invention relates to liquid applicators for animals and has as its primary object the provision of such an applicator wherein inadvertent loss of liquid from the applicator is precluded even though the animals may move the applicator into a tilted position. Applicators of the general type as that disclosed herein have been in widespread use and have generally been successful for providing means for applying a liquid such as insecticide, oil or the like to the hides of the animals as a result of the natural inclination of the animals to rub against the applicator.

It is common for the applicator to be suspended at its ends from chains or the like above the ground so that the animals may roll the applicator about its longitudinal axis while rubbing. This rolling permits gravitation of liquid from apertures in the liquid tank and such liquid is commonly distributed to a flap or apron mounted for contact by the animal.

Quite often, however, the animal tilts the applicator end for end, in conjunction with rolling the applicator. Such end for end tilting has heretofore resulted in inadvertent and often excessive loss of liquid from the tank as a result of flow of the liquid toward the lowermost end of the tank. Strategic placement of the apertures of the tank in the applicator of the instant invention overcomes this disadvantage.

Another important object of this invention is to provide such structure which is free from inadvertent loss of liquid, but which distributes liquid responsive to rolling of the applicator in either direction, thereby insuring an adequate supply of liquid for the animals.

Still another object of the present invention is the provision of novel cups secured to the innermost ends of the liquid tubes to insure an adequate flow of fluid from the tank each time the applicator is rotated and to insure that all of the liquid in the tank is available for ultimate distribution to the animals.

These and other important objects of the invention will be further explained or will become apparent from the specification, claims and drawing.

Figure 1:
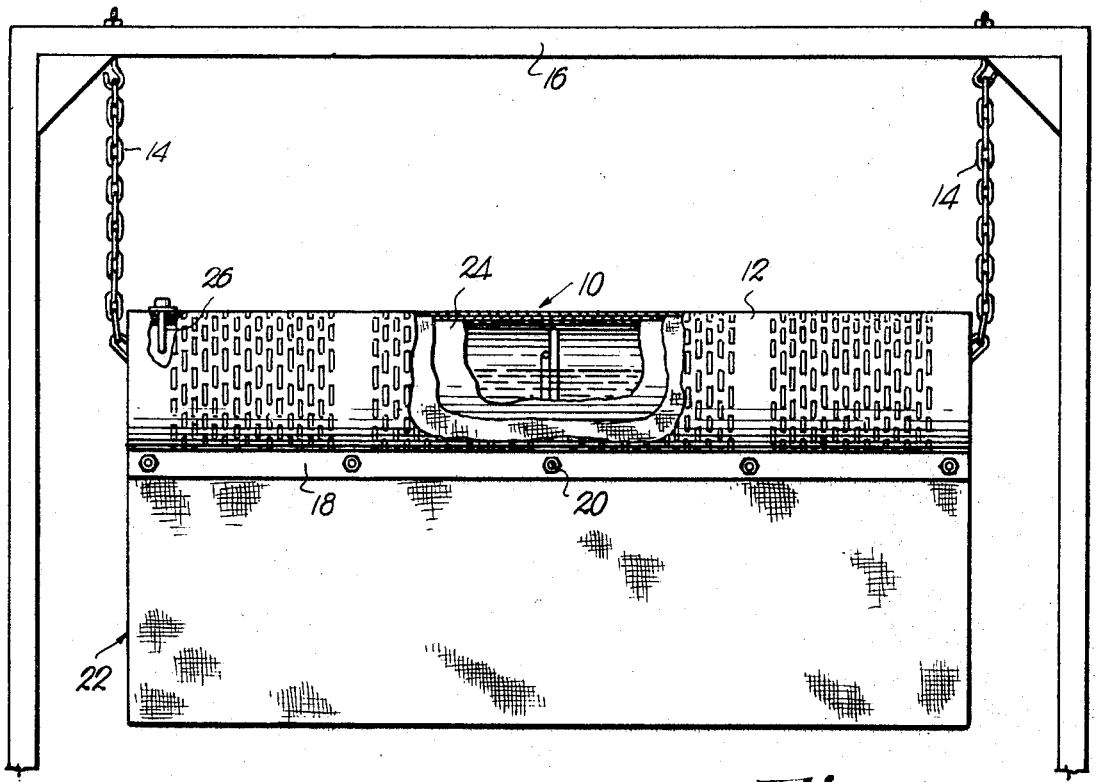
FIGURE 1 is a front elevational view of a liquid applicator constructed pursuant to the principles of this invention, parts being broken away and shown in cross-section to reveal details of construction.
Figure 2:
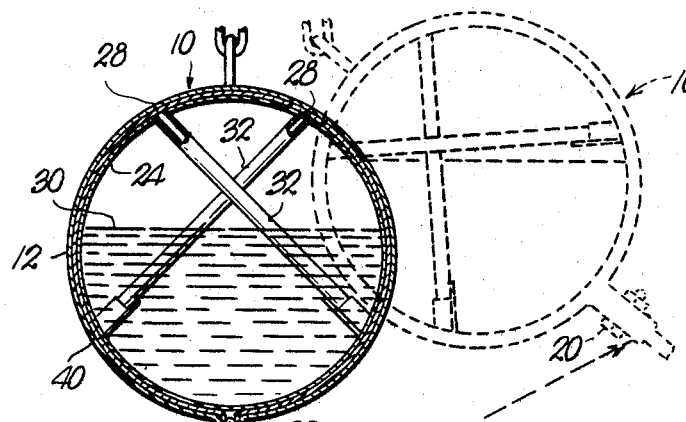
FIG. 2 is an enlarged, vertical, cross-sectional view through the applicator of FIG. 1, a rotated position of the applicator being shown in phantom.

A liquid applicator embodying the principles of this invention is broadly designated by the reference numeral 10 in FIGS. 1 and 2 of the drawing and includes an elongated cylindrical tubular rubbing member 12 adapted to be suspended at each end by chains 14 from any suitable support 16 for holding applicator 10 in vertically spaced relationship above the ground. Ordinarily, cylinder 12 will be maintained in a generally horizontal position and it should be noted that chains 14 are connected to applicator 10 at points above the center of gravity of the latter so that applicator 10 will return by gravity to an initial position thereof after having been swung to a position as illustrated in phantom in FIG. 2 wherein the applicator is rotated about its longitudinal axis. "Rubbing member 12" is formed of sheet material bent to provide the cylindrical configuration for member 12, the sheet material terminating in a pair of opposed longitudinally extending lips or projections 18 provided with bolt means 20 at spaced intervals along the length thereof. As is revealed in FIG. 2, projections 18 extend outwardly from the plane of the cylinder defined by member 12 and are adapted to receive the uppermost longitudinal edge of a fabric sheet or apron 22. Bolt means 20 cooperate with the projections 18 for clamping apron 22 in a position wherein the apron is normally depending from the applicator in position to engage the hides of animals which rub against member 12.

An elongated cylindrical closed tank 24 is carried within rubbing member 12 in concentric relationship thereto and the spaced apart ends of tank 24 terminate substantially coextensive with the opposed ends of rubbing member 12. Manifestly, the lowermost ends of chains 14 may be secured to the end walls of tank 24. A normally closed filler pipe 26 extends through the side wall of tank 24 and member 12 as illustrated in FIG. 1. Pipe 26 extends downwardly into the tank and serves, of course, to permit the introduction of liquid such as insecticide, oil or the like into tank 24.

Figure 3:
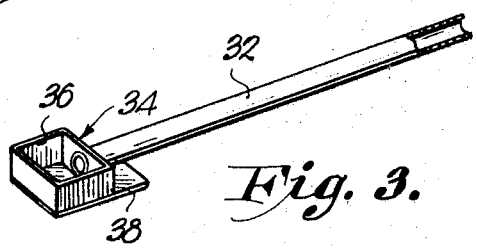
FIG. 3 is a still further enlarged, fragmentary, perspective view of one of the tubes and its associated cup.

A pair of peripherally spaced apertures 28 in the side wall of tank 24 and in dispositions as illustrated in FIG. 2 wherein the apertures 28 are located above the normal level 30 of liquid in tank 24, are located substantially midway between the opposed ends of tank 24 as is apparent in FIG. 1 wherein tubes 32 which communicate with the respective apertures 28 are illustrated. Each tube 32 has one end thereof secured by welding or the like to tank 24 adjacent the corresponding aperture 28 and the tube extends downwardly into the liquid in the tank. The end of each tube 32 terminates in an upwardly opening cup 34 having a generally rectangular configuration defined by walls 36 and a bottom plate 38 as shown best in FIG. 3. The wall 36 opposite from tube 32 may be welded or otherwise secured to the inner surface of tank 24 in opposed relationship from aperture 28 and, as shown in FIG. 3, tube 32 communicates with the interior of cup 34. Filler pipe 26 extends downwardly into tank 24 to approximately the level of the intersection of tubes 32.

It should be noted in FIG. 2 that the tubes 32 and their associated cups 34 span the distances of chords across tank 24 with the tubes crossing above the longitudinal axis of the tank.

An elongated sheet of fabric material 40 is wrapped around the outer surface of tank 24 and is sandwiched between the latter and the outer rubbing member 12. The fabric material 40 extends into contact with the upper edge of apron 22 and may even be integral with the outer layers 42 of apron 22 as illustrated in FIG. 2. Thus, fabric material 40 is in disposition to receive liquid emanating from the apertures 28 and to conduct the liquid by capillary action to the apron 22 for distribution to the animals.

Figure 4:
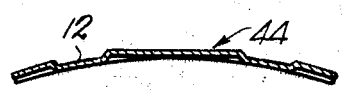
FIG. 4 is a fragmentary, vertical, cross-sectional view through the rubbing member and of the same scale as FIG. 3.

Referring now to FIG. 4, it may be seen that the member 12 is initially formed of sheet material wherein portions 44 are bent from the plane of the cylinder to present a roughened outer surface of the imperforate cylinder member 12.

In operation, the inherent tendency of animals to rub against an object located at a desirable height induces the animals to rub against applicator 10. The animals cause the applicator to swing generally to the position illustrated in phantom in FIG. 2 wherein the tank 24 is rotated about its longitudinal axis. When such rotation proceeds to a degree that the cup end of a tube 32 is disposed slightly higher than the aperture end thereof, liquid in the cup 34 and tube 32 gravitates through the tube and out the corresponding aperture where it is distributed by the wick 40 to the apron 22 for contacting the hides of the animals. Note that if the animal rotates the applicator in the direction opposite that illustrated in phantom in FIG. 2, then the other tube 32 and its corresponding cup 34 deliver the quantity of liquid to wick 40. Manifestly, such action as applicator 10 receives from the animals is sufficient to keep an adequate supply of liquid externally of tank 24 and on apron 22 to accomplish the desired objective of applying insecticide or other liquid to the animals.

Applicator 10 is adapted to be used by animals of varying sizes and more thorough coverage of the animals is thereby obtained if flexible mounting means such as chains 14 are utilized for suspending the applicator. Thus, an animal can rub against the applicator from several directions and against the force of the gravity to encourage use of the applicator by the animals and to more thoroughly cover the surface of the animals as the latter utilize the applicator from several directions. This flexible mounting, however, permits the elongated tank and rubbing member to be tilted end for end. This tilting obviously causes a concentration of the liquid toward the lower end and would result in the inadvertent and excessive loss of liquid from the tank were it not for the location of the apertures 28 and their corresponding tubes 32 substantially midway between the opposed ends of the tank. The end for end tilting occurs generally about axes which are disposed in relative proximity to a mid point between the ends of the tank. Thus, apertures 28 are not substantially lower during such tilting and the level of liquid in the tank always remains below the apertures unless the corresponding cups 34 are elevated through rotation of the applicator. When this occurs, however, the cups 34 are raised above the level of the liquid before the liquid can flow to the aperture, thereby insuring against continued drainage of excessive amounts of liquid from the tank. Accordingly, applicator 10 insures the presence of the right amount of liquid for apron 22 at all times and also insures against inadvertent and costly loss of liquid in excessive amounts.

Since tubes 32 are crossed well above the longitudinal axis of the tank, it is only necessary for an animal to rotate the applicator through an angle of less than 90° for liquid to flow through a tube and out the corresponding aperture 28. It should also be noted that the relatively low profile and open top of the cups 34 insure that liquid is dipped into the corresponding tubes so long as any liquid remains in the tank.

The length of the filler tube 26 governs the level at which liquid can be filled into the tank. When the level of liquid reaches the bottom end of tube 26, air trapped above the liquid in the tank can no longer escape during the filling operation. This automatically prevents inadvertent overfilling of the tank.

I claim:

1. In a liquid applicator for animals having an elongated rubbing member adapted to be suspended at the ends and above the ground for rotation about its longitudinal axis and for returning to an initial position by gravity, and a fabric apron depending from said member, means for supplying liquid to the apron comprising:
   an elongated tank carried within the member for rotation therewith, said tank having a side wall and a pair of spaced apart ends, said tank being adapted for filling with liquid to a predetermined level;
   at least one aperture in said side wall disposed above the level of liquid in the tank when the member is in said initial position;
   a tube in the tank for each aperture respectively, each tube communicating with its corresponding aperture and extending downwardly at an angle into the liquid in the tank, each tube being movable with the tank to a position for gravitation of liquid in the tube toward its aperture upon said rotation of the member about its longitudinal axis; and
   means disposed for receiving said liquid emanating from the aperture and conducting the liquid to the apron, each of said apertures being disposed substantially midway between the ends of said tank to prevent inadvertent loss of said liquid therefrom when one end of the tank is tilted with respect to the other end thereof,
   said member comprising an imperforate sheet bent into a generally cylindrical configuration, portions of said sheet being bent out of the plane of the cylinder to present a roughened outer surface on said member.

2. The invention of Claim 1, wherein said means for receiving the liquid from the aperture and distributing it to the apron includes a fabric wick extending between the aperture and the apron.

3. The invention of claim Claim 2, wherein said member and said tank are cylindrical, the tank being received within the member in concentric relationship thereto, and said wick including an elongated, layer of fabric sandwiched between the tank and the member, said layer being in physical contact with the apron for conducting the liquid from the apertures of the tank to the apron by capillary action.

4. The invention of Claim 1, wherein said sheet terminates in a pair of opposed, end portions extending longitudinally of the member, said end portions being bent away from the cylindrical surface of the member to present a clamp for the apron, said clamp being disposed along the bottom of the member.

5. In a liquid applicator for animals having a rubbing member adapted to be supported above the ground for movement between an initial position and a disposition assumed upon contact by an animal, and means on said member for applying a liquid to the animal as the latter rubs against the member, the improvement comprising:
   a tank carried by said member for movement therewith, and adapted to be filled with said liquid to a predetermined level,
   said tank being provided with an outer wall having a pair of opposed side portions,
   one of said side portions having an aperture therein disposed above said level when the member is in said initial position,
   a tube in said tank extending transversely thereof communicating with said aperture and, when the member is in said initial position, extending downwardly into the liquid in the tank at an oblique angle with respect to the plane of said liquid level; and
   an upwardly opening dipper cup in the tank adjacent the opposite side portion of said wall remote from said aperture and communicating with said tube, said cup and said tube constituting means for receiving liquid at said opposite side of the tank and dispensing the liquid from said one side thereof,
   said tube being movable with the tank to a position where the cup is above the elevation of the aperture as the member shifts from said initial position to the disposition assumed upon animal contact therewith, whrerby a measured amount of liquid flows through the tube by gravity from the cup to the aperture,
   said aperture communicating said tube with said applying means to thereby supply the latter with said liquid.

6. The improvement as claimed in Claim 5,
   said tank being of elongated, tubular configuration and horizontally disposed, and having a central longitudinal axis,
   said aperture, when the member is in said initial position, being located in substantial laterally spaced relationship to a vertical plane in which said axis lies.

7. The improvement as claimed in Claim 5, said opposite side portion having a second aperture therein communicating with said applying means,
   there being a second tube in said tank communicating with said second aperture and, when the member is in said initial position, extending downwardly into the liquid in the tank at an oblique angle with respect to said plane and in crossed relationship to the first mentioned tube; and
   a second, upwardly opening dipper cup in the tank adjacent said wall remote from said second aperture and communicating with said second tube, whereby to supply the applying means with said liquid upon movement of the member in the opposite direction from said initial position upon contact by an animal.

8. The improvement as claimed in Claim 7,
   said tank being of elongated, tubular configuration and horizontally disposed, and having a pair of spaced ends,
   said apertures being disposed substantially midway between said ends and constituting the sole passage means for flow of said liquid from the tank to the applying means, whereby to prevent loss of said liquid from the tank when one end thereof is raised with respect to the opposite end.

9. The improvement as claimed in Claim 7,
   said tank being of elongated, tubular configuration and horizontally disposed, and having a central longitudinal axis,
   said tubes crossing above said axis.